Figure 1:
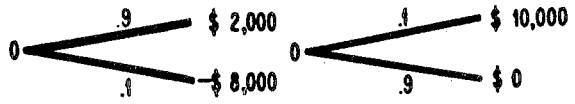
Figure 2:
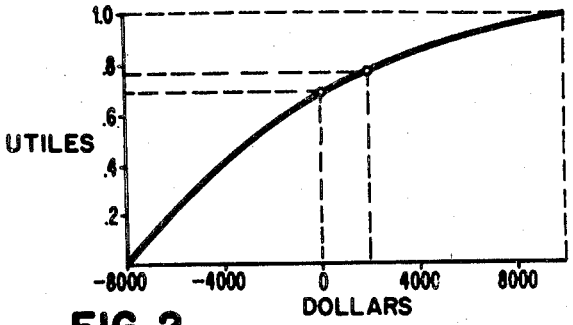
Figure 3:
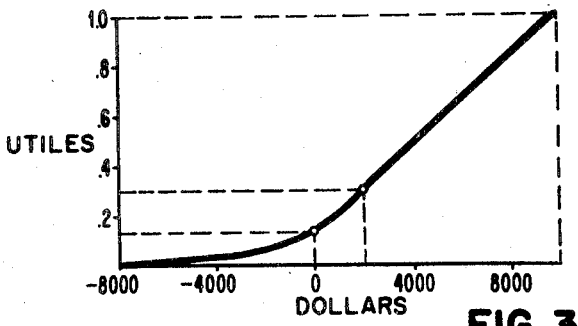
Figure 5:
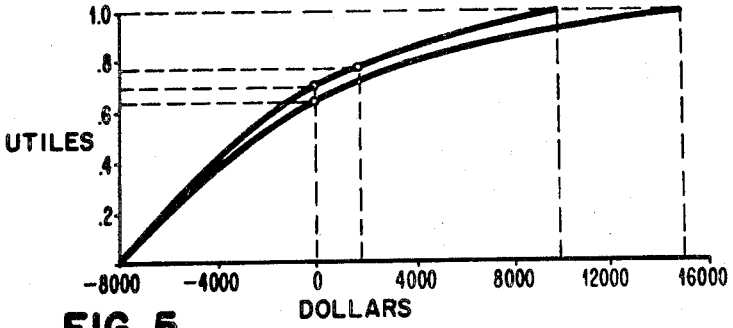
Figure 4:
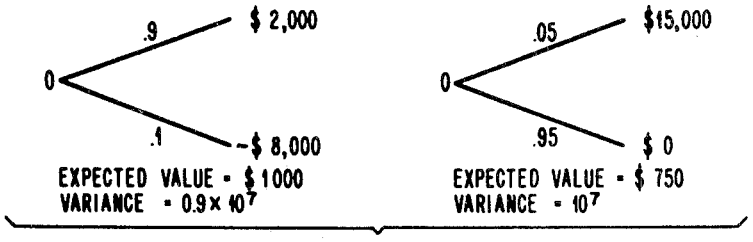
Figure 6:
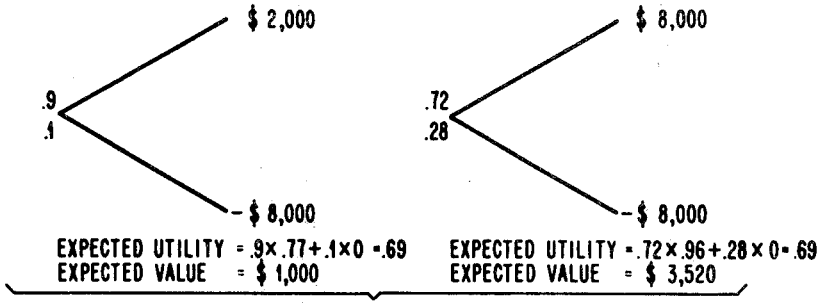
Figure 7:
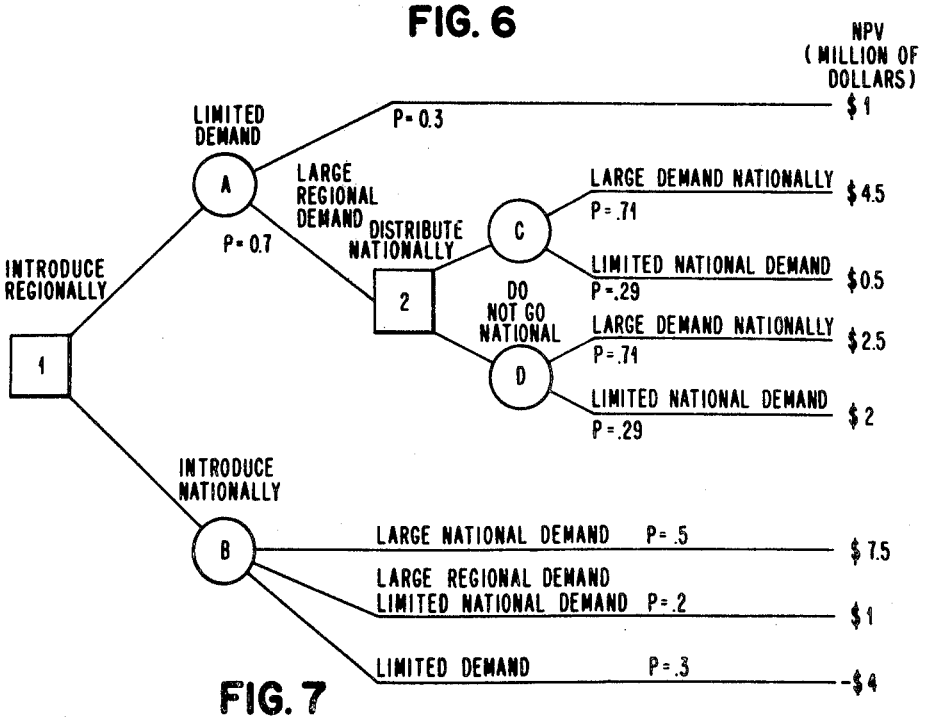
Figure 8:
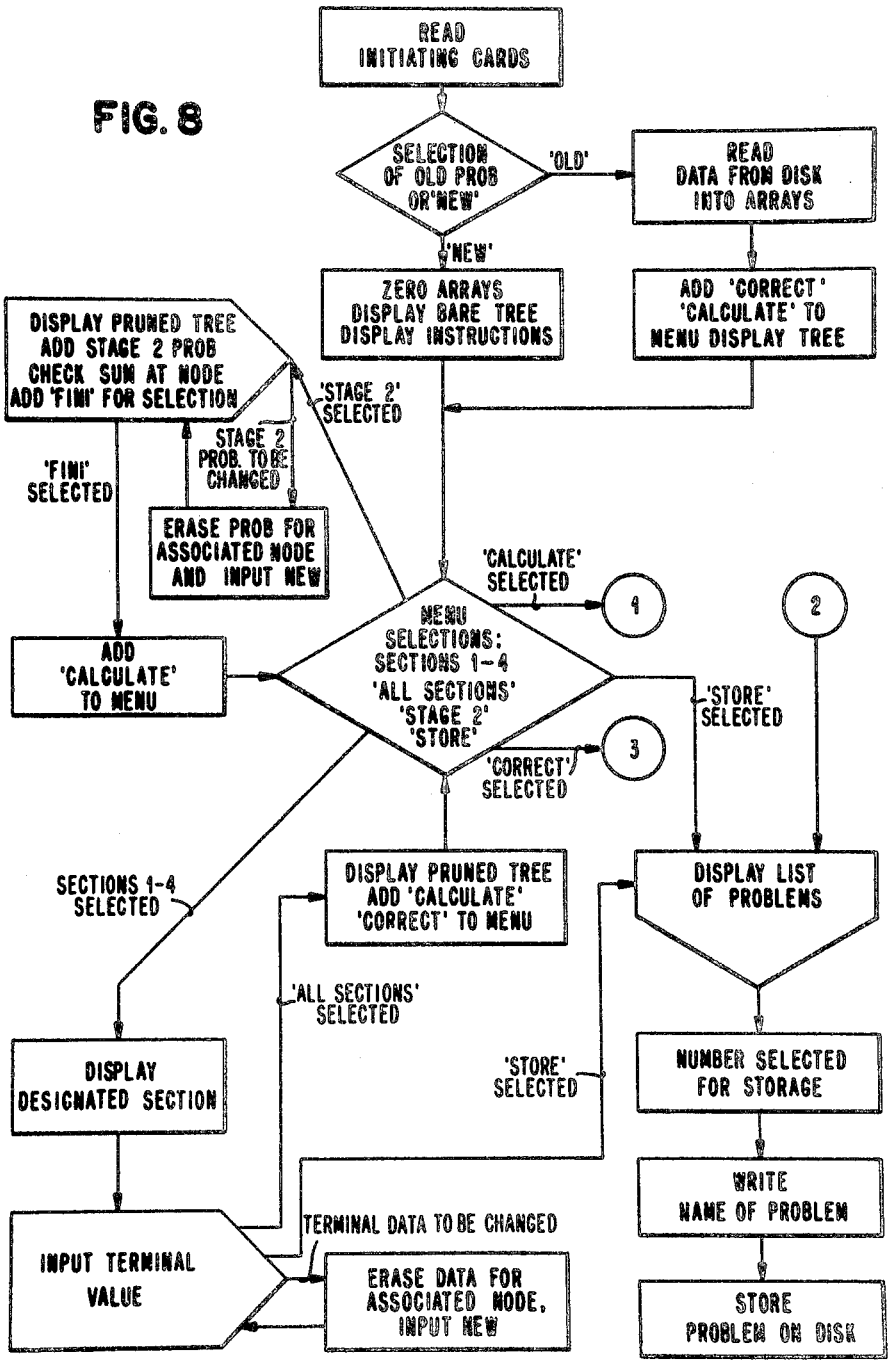
Figure 9:
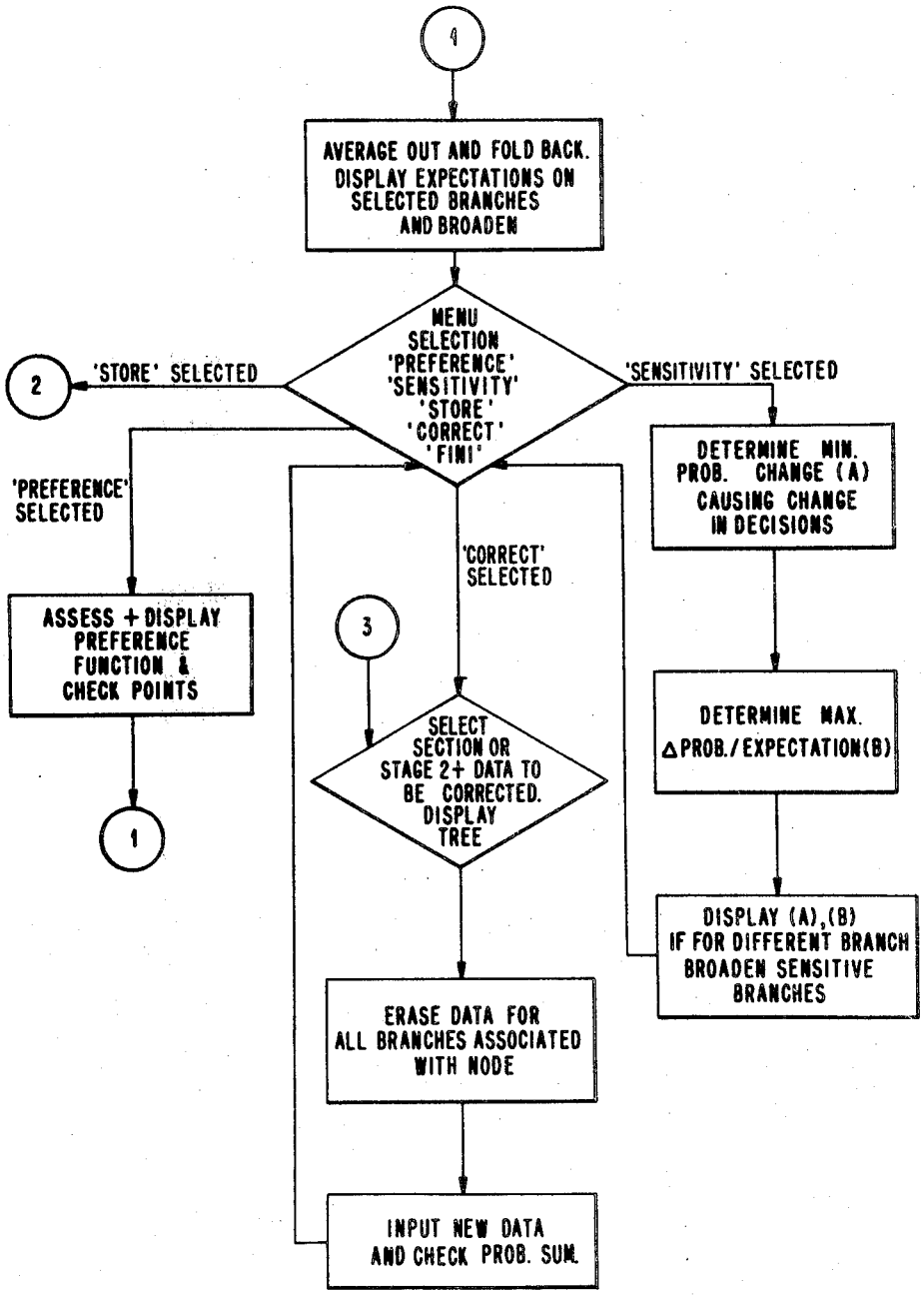
Figures 10, 11:
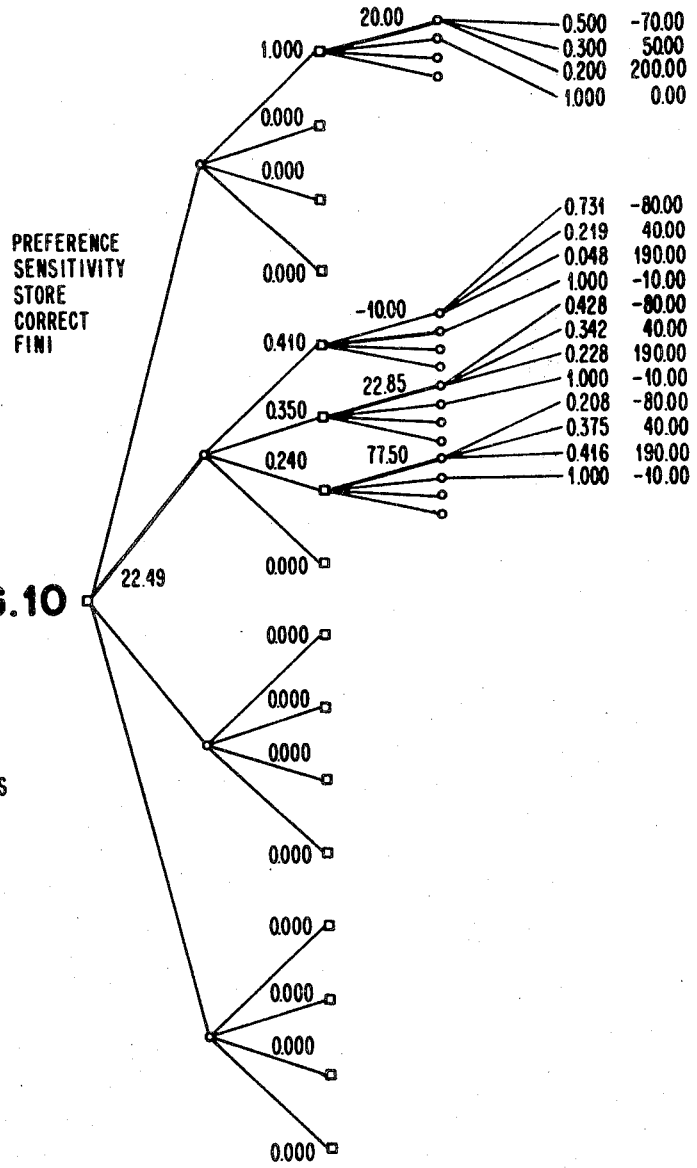
Figure 12:
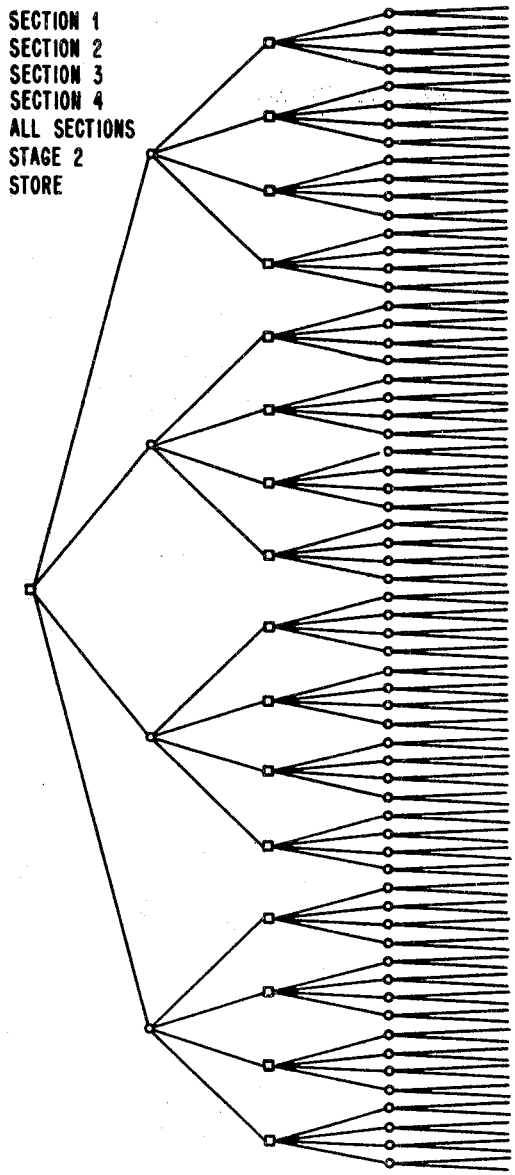
Figure 13:
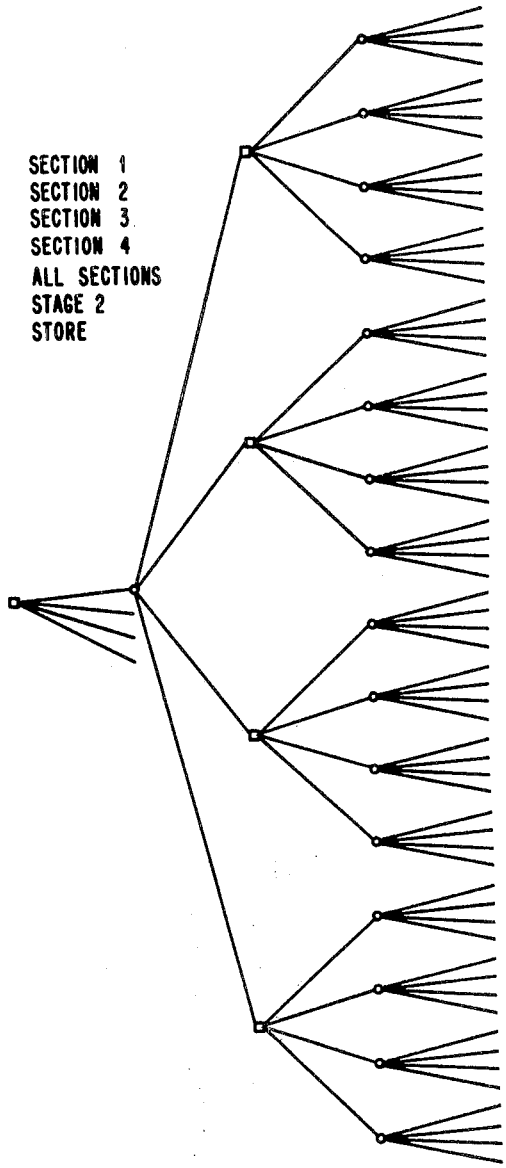
Figure 14:
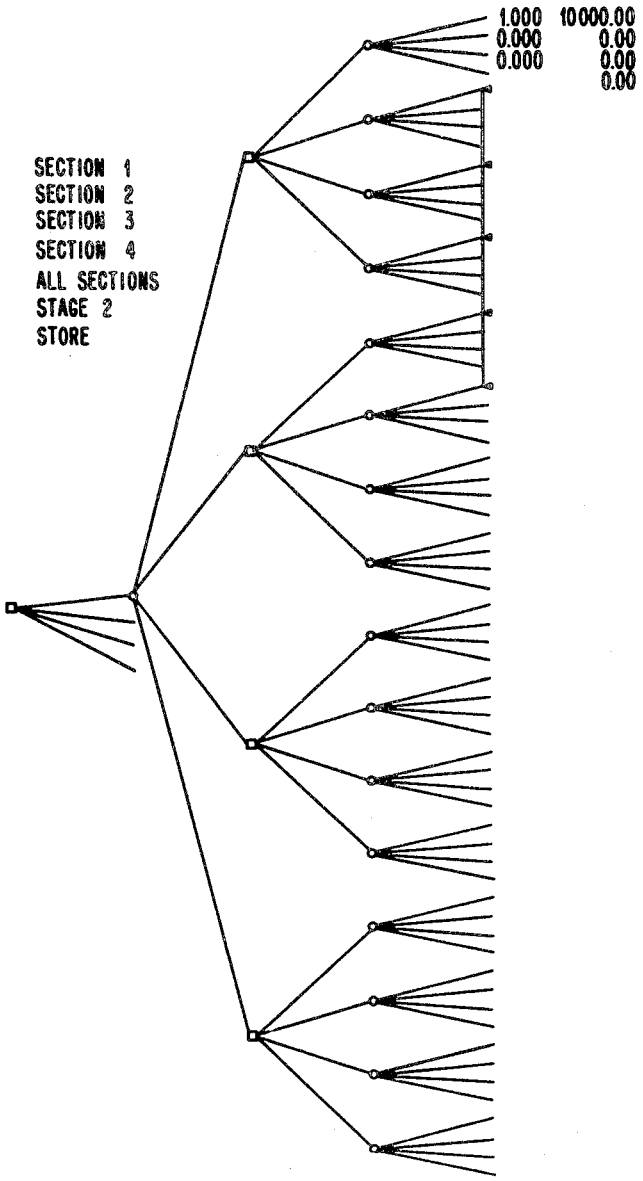
Figure 15:
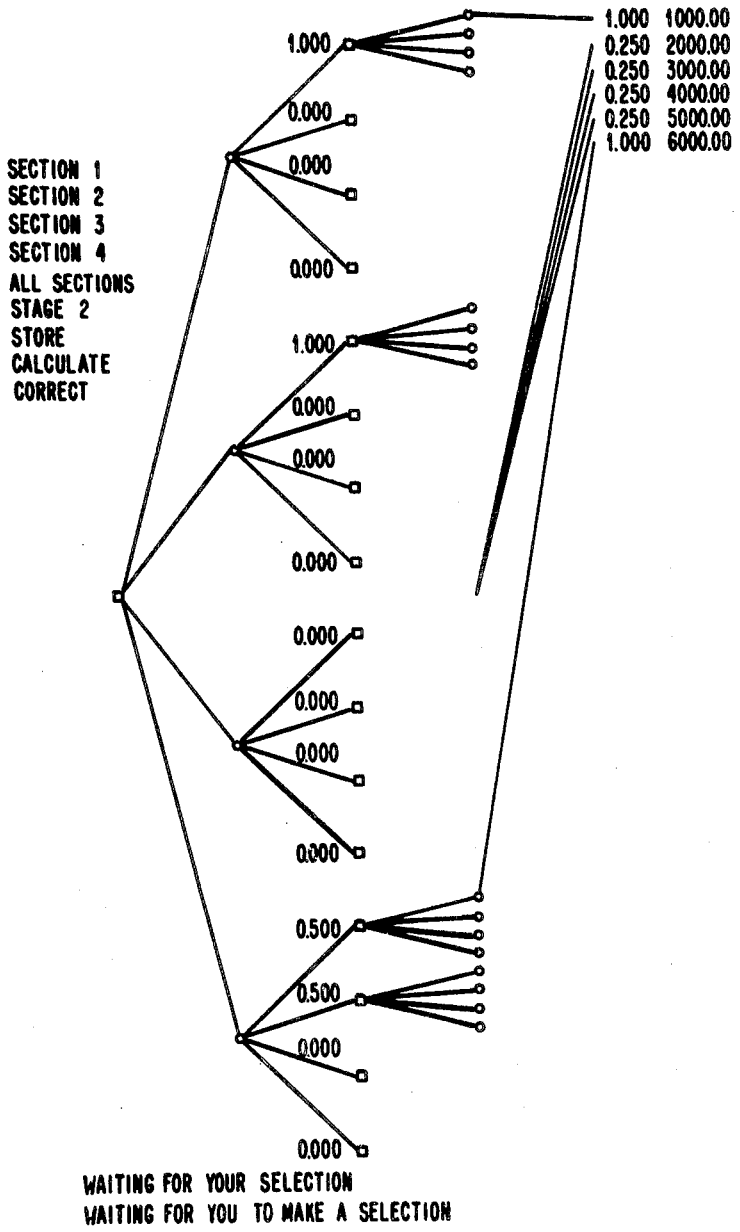
Figure 16:
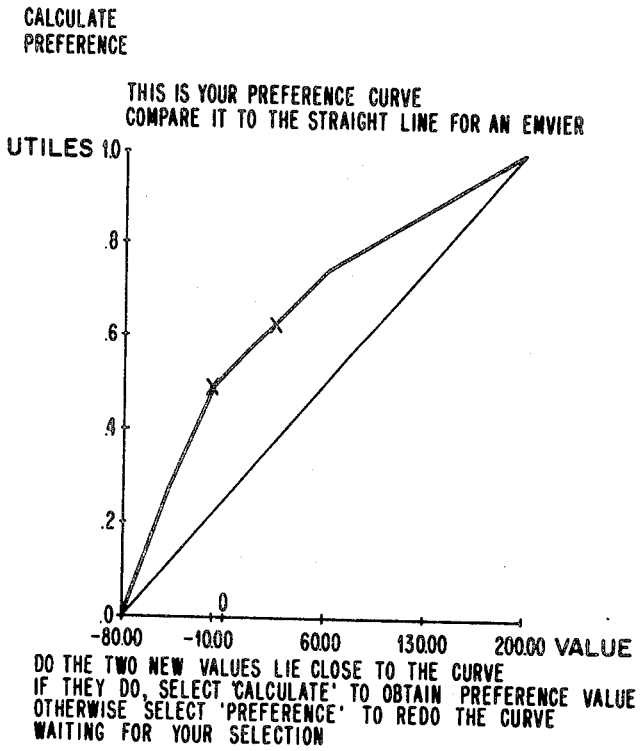
Figure 17:
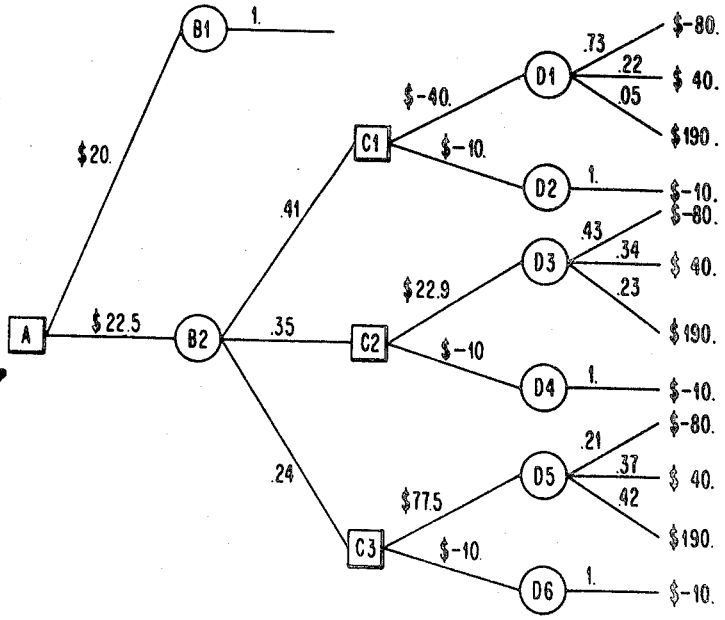
Figure 18:
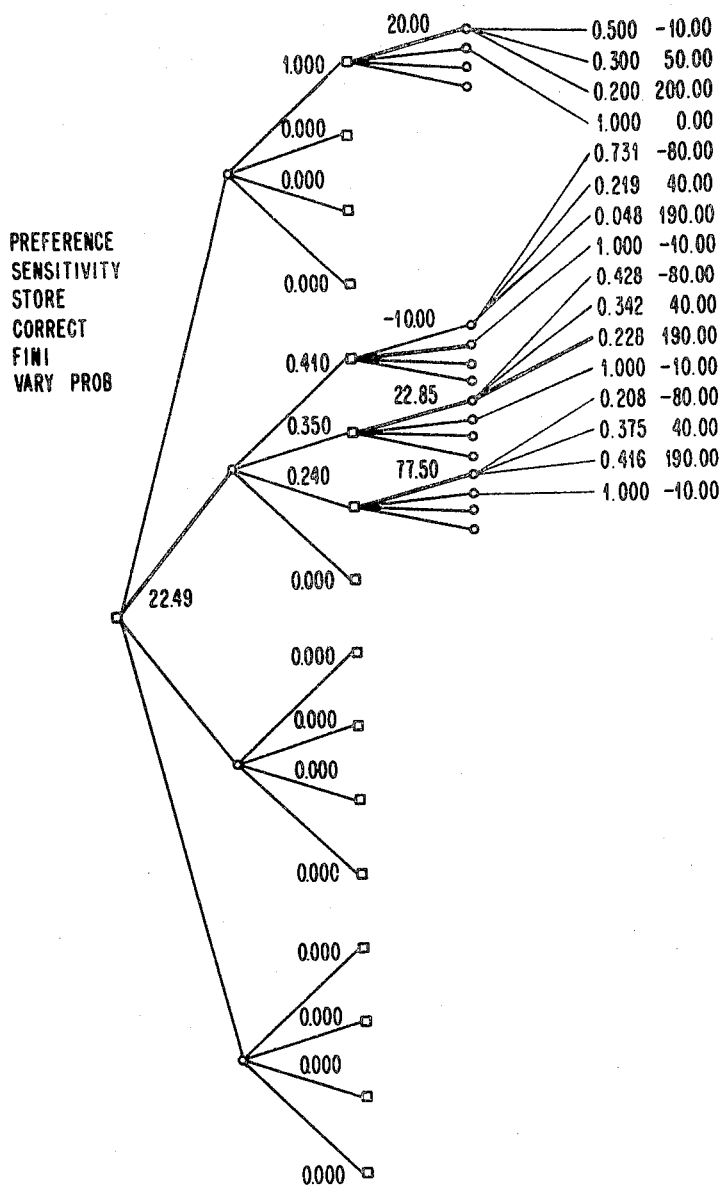
Figure 19:
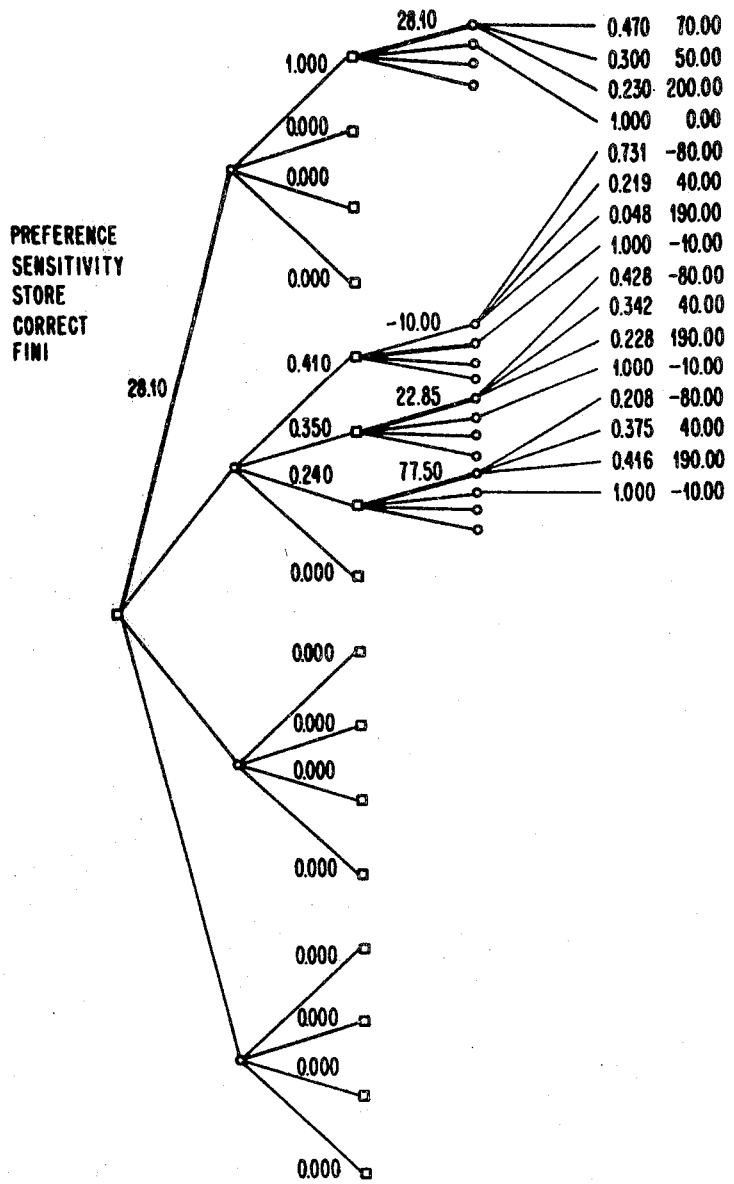
Figure 20:
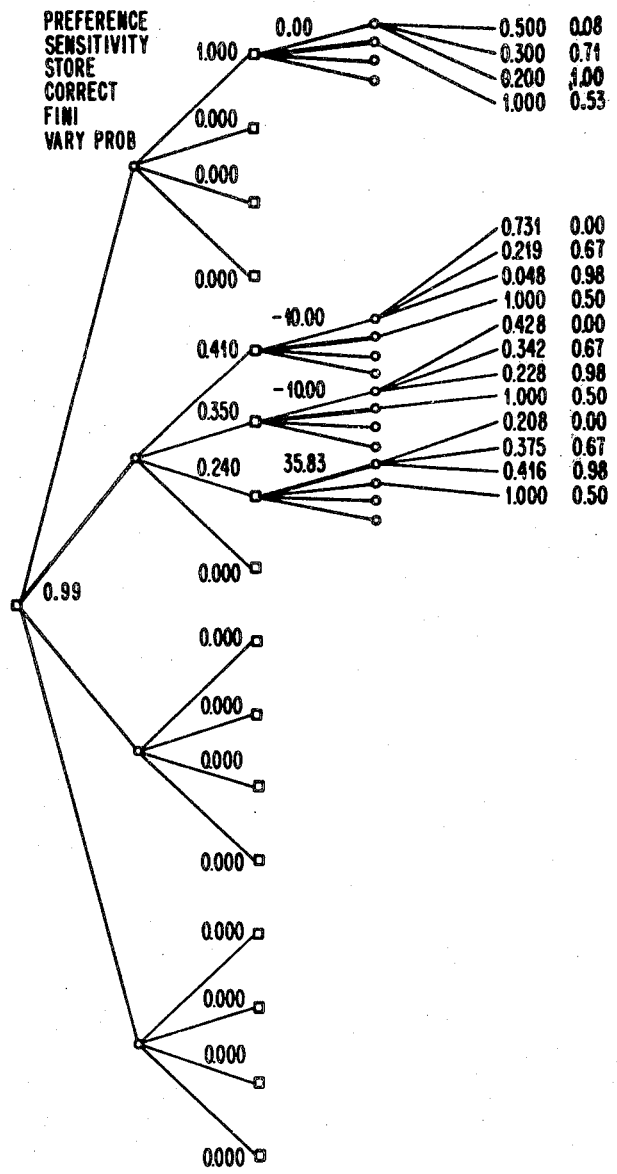
Figure 21:
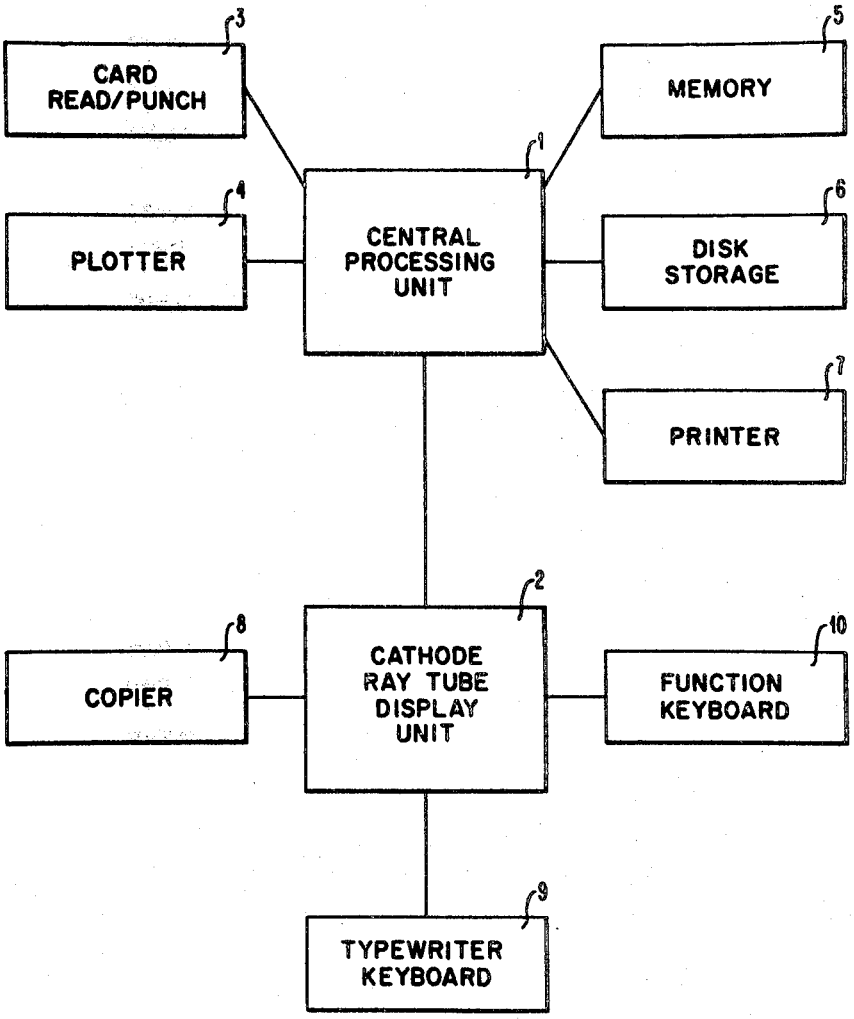

United States Defensive Publication [19] (H) [11] T998,008

DeLano, Jr. [43] Sep. 2, 1980

[54] COMPUTER SYSTEM AND METHOD FOR DECISION TREE ANALYSIS

[75] Inventor: Ralph B. DeLano, Jr., Cold Spring, N.Y.

[73] Assignee: International Business Machines Corporation, Armonk, N.Y.

[21] Appl. No.: 955,823

[22] Filed: Oct. 30, 1978

Related U.S. Application Data

[63] Continuation of Ser. No. 537,305, Dec. 30, 1974, abandoned, which is a continuation of Ser. No. 397,555, Sep. 14, 1973, abandoned, which is a continuation of Ser. No. 174,100, Aug. 23, 1971, abandoned.

[51] Int. Cl.[2] ..... G06F 15/20

[52] U.S. Cl. ..... 364/412; 364/300; 364/401

[57] ABSTRACT

A tool to aid decision-makers in making non-programmed decisions in an uncertain environment. A small computer having graphic display capabilities is combined with a program which provides the means for operating the computer directly by the decision-maker. Problems are stated in decision-tree format with the decision-maker providing probabilities for chance events, terminal values and points on his preference curve. The computer makes choices at decision nodes on the basis of maximization of expected value or utility and displays both the expectation of the project and the decision path. Automated sensitivity analysis is provided to determine those probabilities lying on the decision path which are most sensitive in changing either that path or the expectation. In addition, the effects of varying the probability of any selected branch may be determined. Instructions appear on the display and the user's response is by selecting a program alternate with the light pen or typing a numeral. All results are given on the display.

52 Claims, 14 Sheets Drawing,

171 Pages Specification

The file of this unexamined application may be inspected and copies thereof may be purchased (849 O.G. 1221, Apr. 9, 1968).

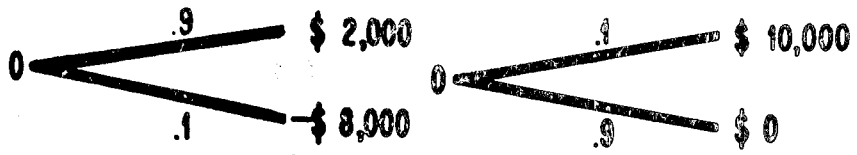

1.. RAIFFA DOLLARS
2.. PROB ASSGN ERRORS
3..
4..
5..
6..
7..
8..
9..
10..
11..
12..
13..
14..
15..
16..
.. NEW

SELECT DESIRED PROBLEM OR 'NEW' WITH LIGHT PEN

WAITING FOR YOUR SELECTION

I HAVE COMPUTED THE VALUE OF YOUR PROPOSITION

THE MOST VALUABLE CHOICES ARE PRINTED AND SELECTED BRANCHES ARE HEAVY

SELECT PREFERENCE TO DO A UTILITY ANALYSIS

SENSITIVITY FOR SENSITIVITY ANALYSIS, FINI WHEN FINISHED, PLEASE SELECT

THIS IS YOUR INITIAL DECISION TREE
THERE ARE FOUR EQUAL SECTIONS OF THE TREE FROM TOP TO BOTTOM
USE LIGHT PEN TO SELECT A SECTION TO BE MAGNIFIED
WAITING FOR YOU TO MAKE A SELECTION

TYPE TERMINAL VALUE FOR BRANCH 1 IF VALUE WOULD EXCEED 3 DIGITS
USE K AFTER DIGITS FOR TIMES 1.000,M FOR TIMES 1.000.000
THEN PUSH ALTN CODING AND END AT THE SAME TIME

PUSH F/K 8 AND F/K 31 TO SKIP ANOTHER NODE
JUST F/K 31 TO CONTINUE

IF THE PROB OF BRANCH 83 DECREASES BY 0.026 FROM 0.228
YOUR FIRST DECISION CHANGES TO BRANCH A 1. YOUR VALUE IS 20.00
THE SAME PROB IS ALSO MOST SENSITIVE IN CHANGING VALUE

I HAVE COMPUTED THE VALUE OF YOUR PROPOSITION
THE MOST VALUABLE CHOICES ARE PRINTED AND SELECTED BRANCHES ARE HEAVY
SELECT PREFERENCE TO DO A UTILITY ANALYSIS
SENSITIVITY FOR SENSITIVITY ANALYSIS, FINI WHEN FINISHED, PLEASE SELECT

THE PREFERENCE VALUE OF YOUR PROJECT IS 0.999
WAITING FOR YOUR SELECTION FROM THE MENU